United States Patent [19]
Dittmar

[11] 3,905,930
[45] Sept. 16, 1975

[54] PAINT FUNGICIDE

[75] Inventor: Bruce Ivor Dittmar, Wilmington, Del.

[73] Assignee: E. I. Du Pont de Nemours and Company, Wilmington, Del.

[22] Filed: Dec. 17, 1973

[21] Appl. No.: 425,070

Related U.S. Application Data

[60] Division of Ser. No. 229,559, Feb. 29, 1972, which is a continuation-in-part of Ser. No. 841,987, July 15, 1969, abandoned.

[52] U.S. Cl. .................. 260/29.6 MN; 106/15 AF; 117/161 R; 260/17 R; 260/42.55; 260/309.2

[51] Int. Cl.$^2$............................................. C09D 5/14
[58] Field of Search ............... 260/29.6 MN, 309.2; 106/15 AF; 424/273

[56] References Cited
UNITED STATES PATENTS
3,817,760  6/1974  Brake .............................. 106/15 AF

*Primary Examiner*—Lucille M. Phynes

[57] ABSTRACT

Dialkyl 1,1'-(hydrocarbylenebiscarbamoyl)bis(2-benzimidazolecarbamates) are useful as paint fungicides.

4 Claims, No Drawings

PAINT FUNGICIDE

CROSS-REFERENCE TO RELATED APPLICATIONS

This application is a divisional of my copending application Ser. No. 229,559, filed Feb. 29, 1972, which application is a continuation-in-part of my copending application Ser. No. 841,987, filed July 15, 1969, now abandoned.

BACKGROUND OF THE INVENTION

Various benzimidazolecarbamates have been found to have outstanding fungicidal activity. Examples of such compounds can be found in U.S. Pat. Nos. 2,933,502 and 2,933,504 and Belgian Pat. No. 698,071.

This invention relates to a novel group of dialkyl [1,1'-(optionally substituted hydrocarbylenebiscarbamoyl)-bis-2-benzimidazolecarbamates] and their use as fungicides for paints.

SUMMARY OF THE INVENTION

It has been found that outstanding fungicidal activity can be obtained by incorporating into paint the following compounds:

dimethyl 1,1'-(4-methyl-m-phenylenedicarbamoyl)bis(2-benzimidazolecarbamate),

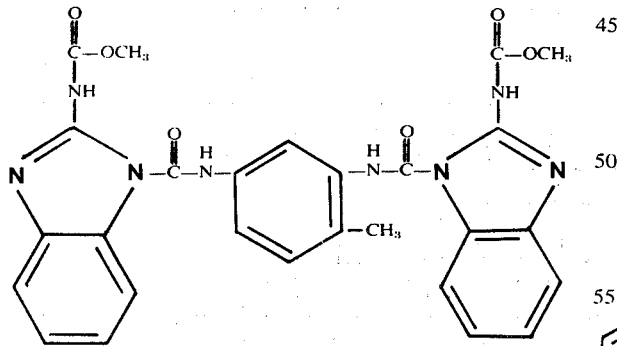

dimethyl 1,1'-(p-phenylenedicarbamoyl)bis(2-benzimidazolecarbamate),

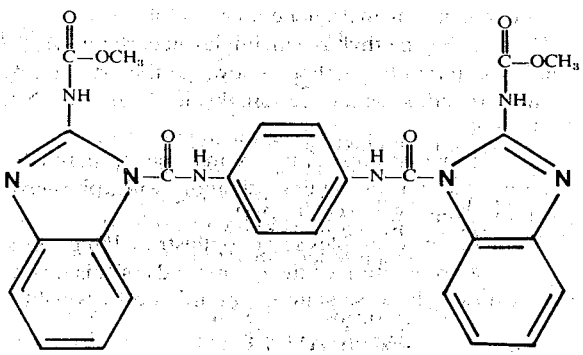

dimethyl 1,1'[methylenedi-(p-phenylcarbamoyl)]bis(2-benzimidazolecarbamate)

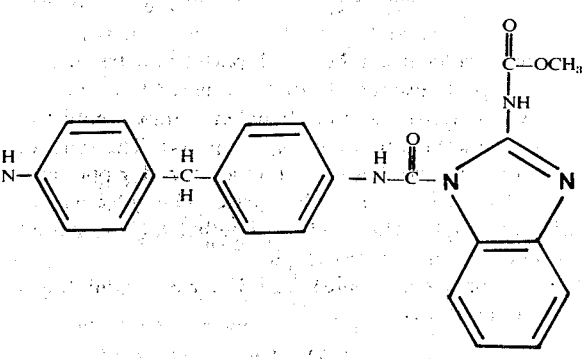

and dimethyl 1,1'[methylenedi-(4-cyclohexylcarbamoyl)]bis-(2-benzimidazolecarbamate).

The preferred compound for use is dimethyl 1,1'-(4-methyl-m-phenylenedicarbamoyl)bis(2-benzimidazolecarbamate).

PREPARATION PROCEDURES

The compounds of this invention can be prepared by reacting 2 moles of methyl 2-benzimidazolecarbamate (I) with an optionally substituted hydrocarbylene diisocyanate (II), as shown below.

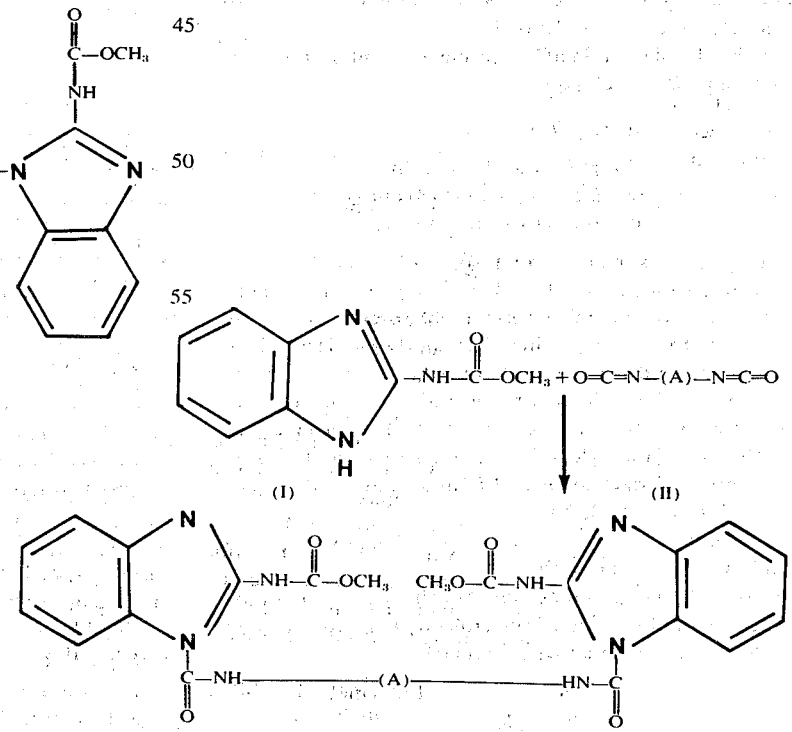

where A is methylenedi-p-phenylene),p-phenylene, 4-methyl-m-phenylene, or methylenedi-(4-cyclohexyl).

The starting methyl 2-benzimidazolecarbamates (I) can be prepared by methods known to the art, e.g., by a three-reaction sequence taught in U.S. Pat. No. 3,010,968.

Hydrocarbylene diisocyanates may be prepared by reacting the corresponding diamine with phosgene [Siefken, Ann., 562, 76 (1948)].

The following examples serve to illustrate the general method of preparation of the compounds of this invention. Unless otherwise stated, all parts are by weight.

EXAMPLE 1

Preparation of Dimethyl 1,1'-(4-methyl-m-phenylenedicarbamoyl)bis(2-benzimidazolecarbamate)

To a stirred mixture of methyl 2-benzimidazolecarbamate (19.1 parts) and triethylamine (0.1 part) in methyl ethyl ketone (300 parts) was slowly added 4-methyl-m-phenylene diisocyanate (8.7 parts) in methyl ethyl ketone (20 parts). The reaction mixture was stirred at room temperature for one hour, filtered to recover the solid phase. The solid was air dried overnight. The product dimethyl 1,1'-(4-methyl-m-phenylenedicarbamoyl)-bis(2-benzimidazolecarbamate) (27.3 parts) exhibited a melting point of 203°–205°C.

EXAMPLE 2

Preparation of Dimethyl 1,1'-(p-phenylenedicarbamoyl)bis-(2-benzimidazolecarbamate)

To a stirred mixture of methyl 2-benzimidazolecarbamate (19.1 parts) and triethylamine (0.1 part) in methyl ethyl ketone (300 parts) was slowly added p-phenylene diisocyanate (8 parts) in methyl ether ketone (20 parts). The reaction mixture was stirred at room temperature overnight. The solid was recovered from the reaction mixture by filtration and air dried. The product dimethyl 1,1'-(p-phenylenedicarbamoyl)bis(2-benzimidazolecarbamate) (26 parts) exhibited a melting point of 350°C.

EXAMPLE 3

Preparation of Dimethyl 1,1'-[methylenedi-(p-phenylcarbamoyl)]bis(2-benzimidazolecarbamate)

To a stirred mixture of methyl 2-benzimidazolecarbamate (19.1 parts) and triethylamine (0.1 part) in chloroform (300 parts) was slowly added methylenedi-(p-phenylisocyanate) (12.5 parts). The reaction mixture was stirred at room temperature overnight. The solid was recovered from the reaction mixture by filtration and air dried. The product dimethyl 1,1'-[methylenedi-(p-phenylcarbamoyl)]bis(2-benzimidazolecarbamate) (30 parts) exhibited a melting point of 330°–334°C.

Dimethyl 1,1'-[methylenebis(4-cyclohexylcarbamoyl)]bis(2-benzimidazolecarbamate) can be similarly prepared by reacting methyl 2-benzimidazolecarbamate with methylenebis(4-cyclohexylisocyanate).

As mentioned previously, it has been found that the compounds of Formula I possess outstanding fungicidal activity when employed to prevent or mitigate damage to paint and painted surfaces. Painted surfaces are protected from stain and discoloration caused by mildew by incorporation of a compound of this invention in the paint formulation.

Painted surfaces can be so protected by incorporating in the paint formulation, prior to application, 5 to 20,000 parts per million of an active compound of this invention. More preferred rates are in the range of 10 to 10,000 parts per million and the most preferred rates are in the range of 20 to 5,000 parts per million. Such treatments with the compounds of this invention also protect the paint while still in the can from deterioration by fungi.

The active compounds are dispersed in the paint formulation by any of the conventional techniques such as dispersing the compound in the liquid vehicle used for the paint and adding the film former.

Further details on the activity and formulation of the active ingredients can be found in the parent application, i.e., Ser. No. 229,559, filed Feb. 29, 1972.

EXAMPLE 4

A latex house paint formulation contains the following ingredients:

|  | Parts |
|---|---|
| Hydroxyethyl cellulose (2.5% solution) | 85 |
| Water | 68.5 |
| Nonionic dispersing agent: | |
| Tamol 731 (25%), sold by Rohm & Haas | 15 |
| Wetting agent: | |
| Triton CF-10, sold by Rohm & Haas | 2.5 |
| Antifoamer: | |
| Nopco NDW, sold by Nopco | 1 |
| Ethylene glycol | 25 |
| Non-chalking rutile titanium dioxide | 250 |
| Talc | 203.7 |
| Fungicide: | |
| dimethyl 1,1'-(4-methyl-m-phenylenedicarbamoyl)bis(2-benzimidazolecarbamate) | 1.2 |

The above materials are ground in a high-speed mill and let down, at a slower speed, as follows:

|  |  | Parts |
|---|---|---|
| Acrylic resin: | | |
| Rhoplex*AC-388 (50%) | | 459.8 |
| Antifoamer: | | |
| Nopco NDW | | 1 |
| Ammonium hydroxide (28%) | | 2 |
| Tributyl phosphate | Premix | 11.5 |
| Propylene glycol | | 35 |
| Water and/or hydroxyethyl cellulose (2.5%) | | 17.5 |
| Toner: Cal/Ink GP8814E Phthalo Blue | | 0.05 |
| Cal/Ink GP8807B Lamp Black | | 0.05 |

*Trade name of Rohm & Haas Company, Philadelphia, Pa. for aqueous dispersion of acrylic copolymers.

Two coats of the latex paint was applied to Whatman No. 1 filter paper substrate. The first coat was allowed to dry for 24 hours before the second was applied. A 1 ½ inch square of the coated paper was subjected to heat (70°C) for 24 hours followed by running tap water for 24 hours. The resulting paint chip is placed on the surface of malt agar in a petri plate and inoculated with an aqueous suspension of *Pullularia pullulans* (the predominant fungus isolated from mildew on painted surface). After a period of 4 weeks, the paint chip had completely inhibited the growth of the fungus whereas a second chip coated with paint containing no fungicide was completely covered with fungus.

Equal weights of the following compounds are substituted in the latex formulation for the dimethyl 1,1'-(4-methyl-m-phenylenedicarbamoyl)bis(2-benzimidazolecarbamate) above. The resulting paint films will be similarly effective in inhibiting the growth of fungi:

Dimethyl 1,1'-(p-phenylenedicarbamoyl)bis(2-benzimidazolecarbamate)

Dimethyl 1,1'-[methylenedi-(p-phenylcarbamoyl)]bis(2-benzimidazolecarbamate)

Dimethyl 1,1'-[methylenebis(4-cyclohexylcarbamoyl)]bis(2-benzimidazolecarbamate)

EXAMPLE 5

Example 4 is repeated using 0.12 part of the fungicide in place of the 1.2 parts. Paint chips prepared from the resulting formulation give similar results in inhibiting the growth of *Pullularia pullulans*.

EXAMPLE 6

Example 4 is repeated using 6 parts of the fungicide in place of the 1.2 parts. Paint chips prepared from the resulting formulation give similar results in inhibiting the growth of *Pullularia pullulans*.

I claim:

1. A fungus-resistant paint composition comprising a dispersion of a film-former in a liquid vehicle containing 5 to 20,000 parts per million by weight, basis total paint composition, of a fungicidal compound selected from the group consisting of dimethyl 1,1'-(4-methyl-m-phenylenedicarbamoyl)bis(2-benzimidazolecarbamate);

dimethyl 1,1'-(p-phenylenedicarbamoyl)bis(2-benzimidazolecarbamate);

dimethyl 1,1'-[methylenedi-(p-phenylcarbamoyl)]bis(2-benzimidazolecarbamate); and dimethyl 1,1'-[methylenedi-(4-cyclohexylcarbamoyl)]-bis(2-benzimidazolecarbamate).

2. The paint composition of claim 1 in which the dispersion of film-former is a latex.

3. The paint composition of claim 1 containing 10 to 10,000 parts per million by weight of fungicidal compound.

4. The paint composition of claim 3 in which the fungicidal compound is dimethyl 1,1'-(4-methyl-m-phenylenedicarbamoyl)bis(2-benzimidazolecarbamate).

* * * * *